United States Patent [19]

Pringle

[11] Patent Number: 4,921,342

[45] Date of Patent: May 1, 1990

[54] DEVICE FOR PERFORMING CINEMA SHOTS IN CONDITIONS OF LOW VISIBILITY

[76] Inventor: Helen Pringle, Via L. Gherzi, 8, Rome, Italy

[21] Appl. No.: 229,150

[22] PCT Filed: Dec. 4, 1986

[86] PCT No.: PCT/IT86/00089

§ 371 Date: Jul. 14, 1988

§ 102(e) Date: Jul. 14, 1988

[87] PCT Pub. No.: WO88/04441

PCT Pub. Date: Jun. 16, 1988

[51] Int. Cl.⁵ .................................. G03B 1/60
[52] U.S. Cl. .......................... 352/171; 352/4; 352/131; 354/222; 354/289.12
[58] Field of Search .......... 352/4, 131, 170, 171; 354/222, 289.12, 219

[56] References Cited

U.S. PATENT DOCUMENTS

| 2,393,316 | 1/1946 | Edgerton | 352/131 |
| 2,920,134 | 1/1960 | Dresser | 352/4 |
| 3,264,930 | 8/1966 | Koeppe | 354/222 |
| 4,101,916 | 7/1978 | Gottschalk et al. | 354/219 |
| 4,279,481 | 7/1981 | Ishibashi et al. | 352/171 |
| 4,294,529 | 10/1981 | Sato et al. | 354/466 |

FOREIGN PATENT DOCUMENTS 3537742 3/1986 Fed. Rep. of Germany .
2070270 9/1981 United Kingdom .

Primary Examiner—Monroe H. Hayes
Attorney, Agent, or Firm—Beveridge, DeGrandi & Weilacher

[57] ABSTRACT

Cinematography under low visibility conditions is facilitated by providing a camera with a slide that has photoengraved markings in the ocular path for indicating the borders of the camera field, light emitting diodes for lighting an edge of the slide, and logic circuitry that energizes the light emitting diodes in synchronism with the rotation of the camera shutter so that the light emitting diodes are energized when the shutter is closed.

8 Claims, 2 Drawing Sheets

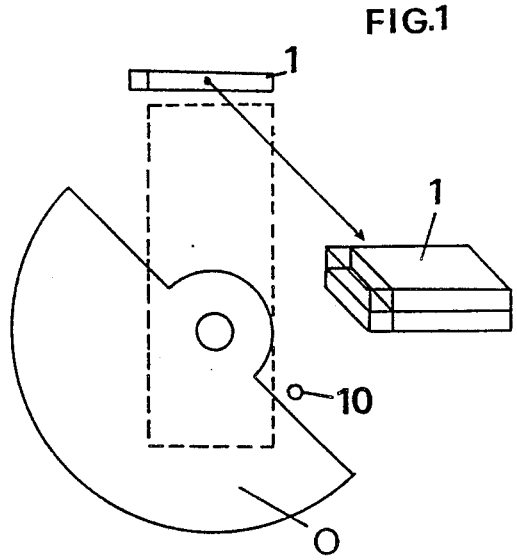
FIG.1
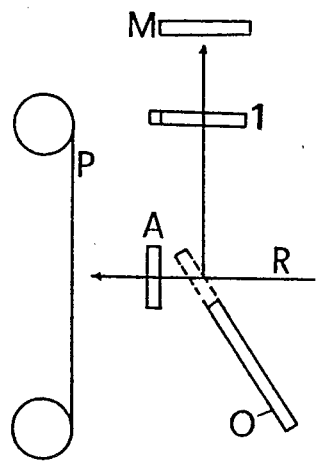
FIG.2
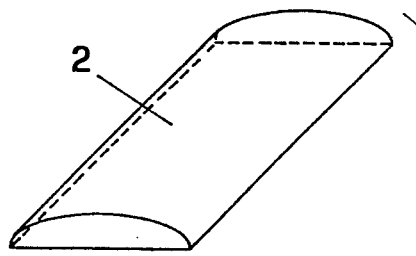
FIG.4
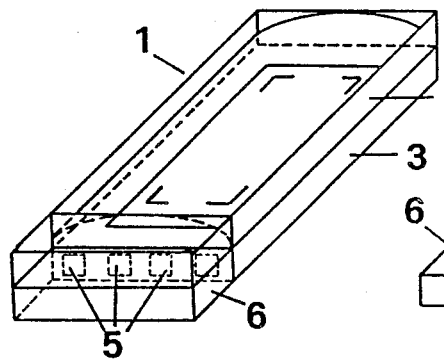
FIG.3
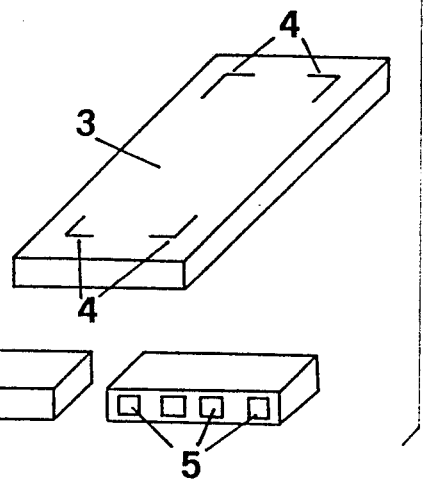

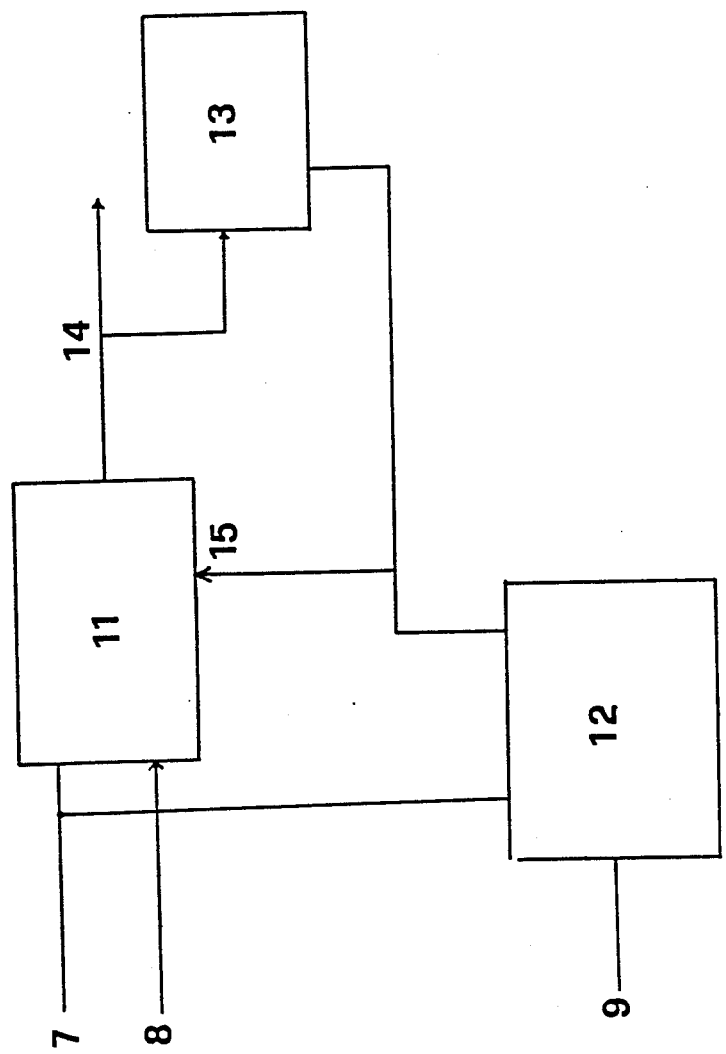

DEVICE FOR PERFORMING CINEMA SHOTS IN CONDITIONS OF LOW VISIBILITY

The present invention concerns a device that may be applied on a 35 mm and other kinds of motion-picture cameras, for effecting cinema shots in low visibility conditions, with a slide being lighted, in its shot field, by a plurality of lighting logics that will determine the protection of the film against electrical and/or mechanical malfunction.

It is well known, devices have been realized with the purpose of limiting the field edge of cinema shots, in conditions of low visibility, which make use of optic fibres and others use slides, placed on the optical run, not in correspondence with the focal plane, so as to determine a considerable inaccuracy in the edge references beyond a frequent possibility of ruining the film, hit by the light emitted for lighting the slide, when there is a lack of synchronism between the lighting and the rotation of the shutter.

It is the aim of the present invention to solve all above mentioned inconveniences of the devices according to the art, in an easy and safe way.

According to the present invention, the aim set forth is reached by means of a device for cinema shots in low visibility conditions, comprising a slide placed on the focal plane, consisting of two coupled elements, a frosted lens and an element provided with references, obtained with the photoengraving process, for the determination of the field edge due to the lighting of said references by a series of leds, lighted by a control from the motor in synchronism with the rotation of the shutter.

The object of the present invention comprises furthermore a sensor for the control of the rotation of the specular shutter and a plurality of electronical logics: one compares the signal of the motor with the one of said sensors and extinguishes the slide lighting leds, lighting a warning light in that case in which the two signals are not in synchronism, and another one that provides the extinguishing of the leds should any malfunction, mechanical or electrical, cause a leds lighting period longer that determined.

The evident advantages of the device according to the present invention are:

the photoengraved reference on the slide lighted by the leds, that allows a good definition of the cinema shot field also in low light conditions.

The logic operated by the sensor prevents in any case the light from the slide from hitting and ruining the film.

The present invention will be described more in detail hereinbelow according to the enclosed drawings showing a preferred embodiment.

FIG. 1 shows a front scheme and an exploded view of the housing of the multiple slide in a camera.

FIG. 2 shows a lateral scheme of the optical run of the light beams.

FIG. 3 shows an axonometric, transparent view of the multiple slide with the placing of the lighting leds.

FIG. 4 shows an axonometric, exploded view of the components of the multiple slide.

FIG. 5 shows a block scheme of the electrical control logics.

The present invention concerns a device for cinema shots in low visibility conditions, that may be applied on 35 mm or other kinds of cameras, comprising a multiple slide 1, consisting of a lens 2 with a frosted surface and of a slide 3, showing references 4 performed by photoengraving and lighted by leds 5 housed in container 6 placed in correspondence with the edge of said slide 3.

Said slide 1 is placed on the focal plane, so that the beams R of the outside image—once the rotation of specular shutter O during working of the camera, causes the same to cover opening A—are no longer able to hit the film P, but will be reflected on said shutter O and reach ocular M thus allowing the operator to determine the field edge.

According to the present invention, said leds 5 are lighted in that moment when the film is covered by shutter O and therefore the vision is in ocular M. Furthermore, the field of the slide 1 corresponds, without any error, to the impression field of film P.

Relating now to the details of the block system of FIG. 5, the following elements are shown:

a stop shutter synchronism signal 7;

an encoder signal 8;

an infrared signal 9, coming from a sensor 10, with its synchronism on shutter O;

a logic 11 determining the lighting of leds 5;

a logic 12 comparing the two synchronism signals;

a logic 13 controlling the lighting duration time of leds 5;

a lighting 14 of the leds;

a lighting block 15.

The synchronism for the lighting of the leds 5 is taken from the movement signals of the camera motor not shown in the drawings, the movement of which is connected to the one of the shutter, in a known way; in particular, the synchronism of the leds 5 lighting is obtained by the known signal that will block the shutter O in the covering position. The impulses of the motor encoder, having the task of adjusting the speed, and which remain always the same, at each turn and at every speed, are used for determining the time period after the synchronism signal in which leds 5 are to be lighted and the lighting duration of said leds. This allows to have the leds lighted always in the position of covered shutter O, at any speed.

The lighting logic, according to the block scheme of FIG. 5, is protected against electrical and mechanical malfunctions.

In that case in which there is no signals coming from the motor, or in which said electronics do not work, the logic 13 performs a control on said leds 5, so that they do not remain lighted for a period longer than the time corresponding to the lowest speed possible. Should this happen, a blocking 15 of the lighting is determined. Furthermore, in case of mechanical phase displacement between the motor and the shutter O, which would cause a lighting on an uncovered film P which is not to be noted from any electrical signal provided in the camera, logic 12, controlled by sensor (10) that analizes the run of shutter (O), compares the signal as well as the one coming from the motor and blocks the lighting, in that case in which said signals prove to be out of phase.

I claim:

1. A device for cameras of the kind able to realize cinema shots in low visibility conditions by means of a lighted slide for the determination of the field edge, characterized in that said slide (1) is multiple and comprises of a lens (2) with frosted surface and in a slide (3), showing photoengraved references (4) that limit the field edge, and in that said references (4) are lighted by a series of leds (5), housed in a container (6) placed in correspondence to the edge of said slide (3), and in that said leds (5) are lighted in synchronism with the rotation of a shutter (O) by means of lighting logics (11, 12 and 13).

2. A device for cinema shots in conditions of low visibility according to claim 1, characterized in a block scheme, comprising the lighting logics, comprising of: a stop shutter synchronism signal (7); an encoder signal (8); an infrared signal (9), coming from a sensor (10), with its synchronism on shutter (O); a logic (11) determining the lighting of leds (5); a logic (12) comparing the two synchronism signals; a logic (13) controlling the lighting duration time of leds (5); a lighting (14) of the leds; a lighting block (15).

3. A device for cinema shots in conditions of low visibility according to claim 2, characterized in that the lighting synchronism of leds (5), with the motion of shutter (O), is obtained by that signal able to stop said shutter (O) in the covering position.

4. A device for cinema shots in conditions of low visibility according to claim 1 characterized in that the time period after the synchronism signal in which the leds (5) are lighted and the lighting time period of said leds are determined by the impulses of the motor encoder, so that the leds (5) will always be lighted in the position of covered shutter, at any speed.

5. A device for cinema shots in conditions of low visibility according to claim 1, characterized in that the logic that controls the lighting duration time of the leds, also controls that the same do not remain lighted for a time period longer that the one corresponding to the lowest possible speed, so that, in that case in which there are no signals coming from the motor or in which the electronic does not work, the lighting blocking is determined.

6. A device for cinema shots in conditions of low visibility according to claim 1, characterized in that the comparing logic (12), controlled by sensor (10), while analizing the turn of shutter (O), compares the signal with the one coming from the motor and blocks the lighting in that case in which said signals prove to be out of phase.

7. A device for cinema shots in conditions of low visibility according to claim 1, characterized in that said multiple slide (1) is placed on the focal plane, so as to show a field corresponding to the impression one of film (P).

8. A device for cinema shots in conditions of low visibility according to claim 1, characterized in that the lighting synchronism of leds (5), with the motion of shutter (O), is obtained by that signal able to stop said shutter (O) in the covering position.

* * * * *